United States Patent
Moldenhauer et al.

[11] 3,841,817
[45] Oct. 15, 1974

[54] PELLETIZING APPARATUS

[76] Inventors: August J. Moldenhauer; Melvin A. Moldenhauer; Richard J. Moldenhauer, all of Menfro, Mo. 63765

[22] Filed: Sept. 19, 1973

[21] Appl. No.: 398,854

[52] U.S. Cl. .............. 425/331, 425/190, 425/209, 425/308
[51] Int. Cl. ....... B29c 3/02, B29f 3/012, B30b 3/02
[58] Field of Search .......... 425/107, 190, 191, 192, 425/196, 200, 202, 207, 209, 232, 306, 308, 313, 376, 381

[56] References Cited
UNITED STATES PATENTS

| | | | |
|---|---|---|---|
| 2,167,900 | 8/1939 | Meakin | 425/190 X |
| 2,178,009 | 10/1939 | Helm | 425/107 |
| 2,240,660 | 5/1941 | Meakin | 425/107 |
| 2,295,743 | 9/1942 | Meakin | 425/306 |
| 2,648,296 | 8/1953 | Oliver | 425/331 X |
| 2,764,952 | 10/1956 | Meakin | 425/331 X |
| 2,908,038 | 10/1959 | Meakin | 425/192 |
| 3,010,150 | 11/1961 | Meakin | 425/331 |
| 3,232,245 | 2/1966 | Lawrence et al. | 425/331 |
| 3,327,653 | 6/1967 | Crane | 100/156 |
| 3,538,546 | 11/1970 | Gilman | 425/192 |
| 3,807,926 | 4/1974 | Morse | 425/331 |

*Primary Examiner*—J. Howard Flint, Jr.
*Attorney, Agent, or Firm*—John A. Mawhinney

[57] ABSTRACT

A pelletizing apparatus has a mixing chamber in which rotates a mixing shaft having a plurality of extrusion rollers mounted thereon for rotation therewith and an annular stationary die operative associated with said rollers and which provides substantially the sole support through said rollers for the mixing shaft so that the need for supporting bearings for a mixing shaft is eliminated.

13 Claims, 9 Drawing Figures

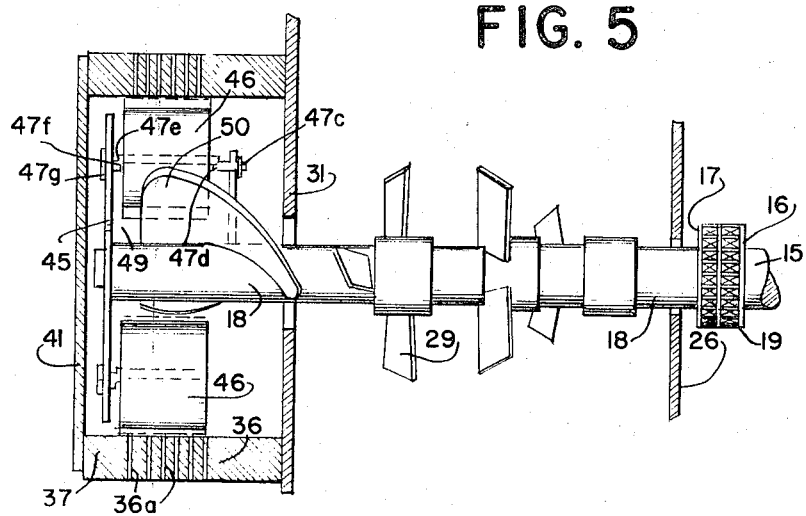
FIG. 5
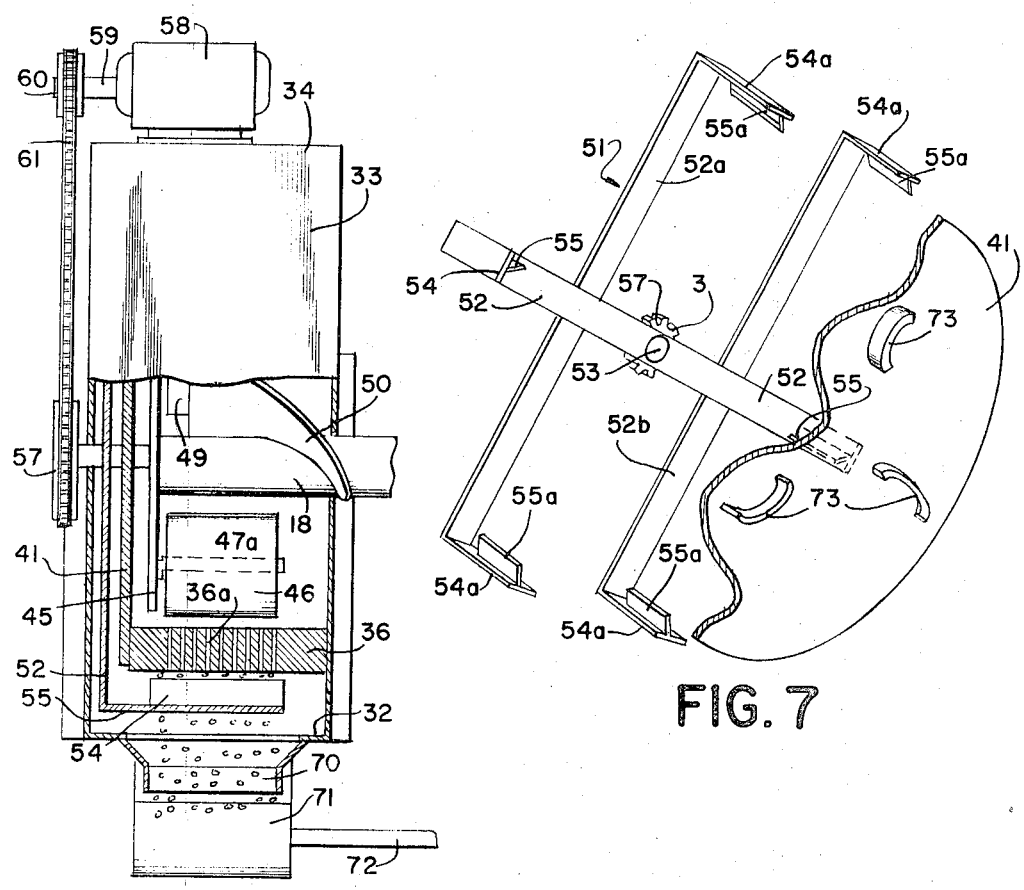
FIG. 6
FIG. 7

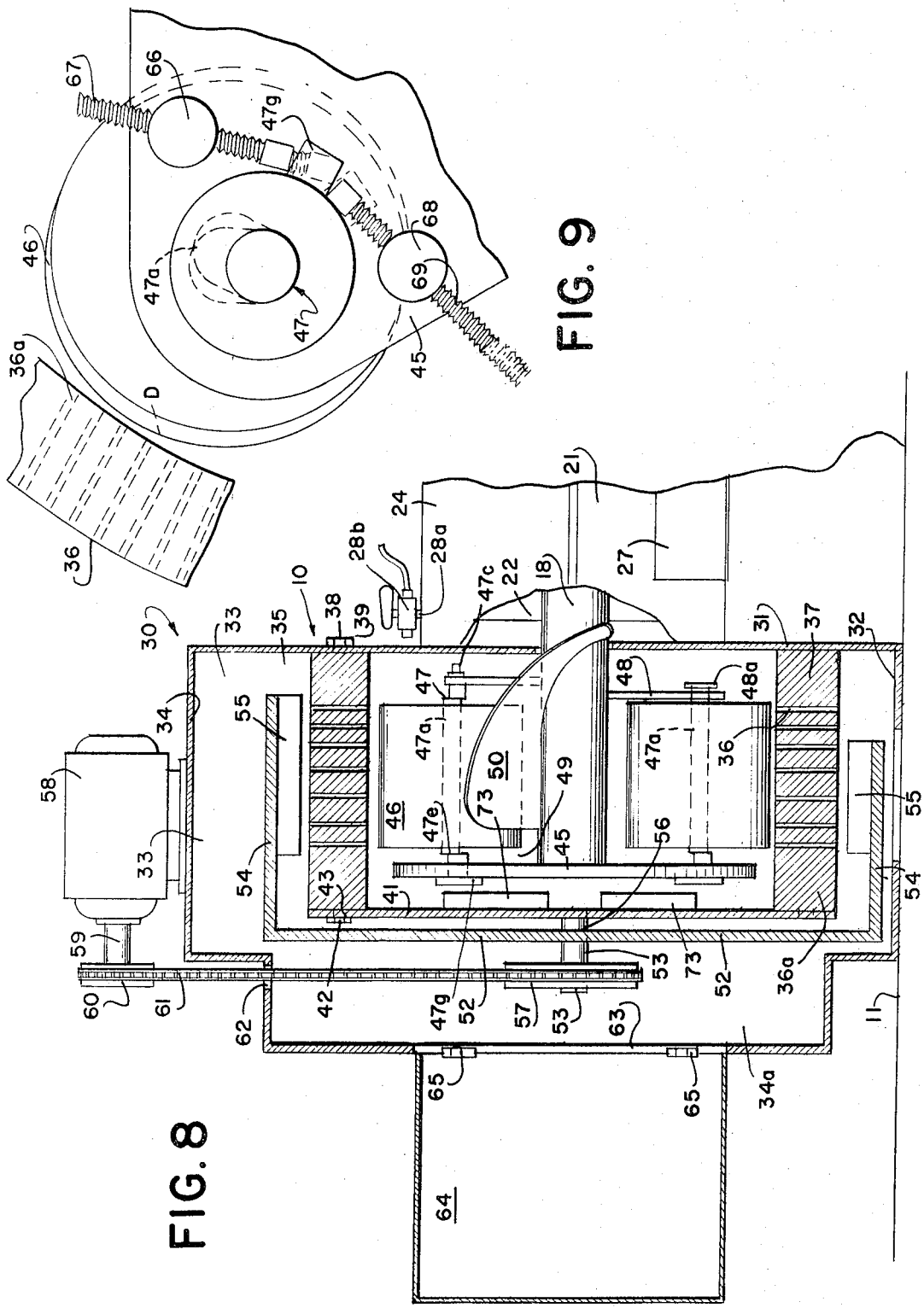

PELLETIZING APPARATUS

BACKGROUND OF THE INVENTION

1. Field of The Invention

The present invention generally appertains to pelletizing apparatus for extruding the material being treated into pellets of the desired length and such materials as ground wheat, alfalfa, corn and cotton can be pelletized by the present invention.

2. State of The Prior Art

There are many and varied known types of pelletizing apparatuses for treating the aforementioned materials but, in the main, both of such apparatuses suffer from the disadvantage that the extrusion dies are rotatable and that the mixing shaft must be supported by costly bearings. Moreover in the prior art which require the use of bearings, sealing means must be provided for preventing the material being treated from entering the bearings and thereby destroying the same. Moreover, in the prior art devices whenever it is necessary to renew the bearings, the extrusion rollers or the die the shut down time of the prior art devices is much longer and the labor costs are much higher than in the present invention. Also by eliminating the bearings no oil or lubricant is required therefor.

SUMMARY OF THE INVENTION

A primary object of the present invention is to eliminate supporting bearings for the mixing shaft and this is accomplished by having the extrusion rollers which are carried by the mixing shaft at the forward end thereof engaging the inner surface of a stationary die ring so that the die ring through the extrusion rollers provides substantially the sole support for the mixing shaft.

At its rear end the drive shaft has one member of a resilient coupling fixed thereto while the other member of the coupling is fixed to the drive shaft of a reduction gearing and the two members of the coupling are spanned by a drive chain or belt. In this way the rear end portion of the drive shaft for the rollers is restricted against substantially all wobbling or back lash as a continuous drive is provided for the drive shaft, the resulting small vibration at rear of the shaft is negligible.

The extrusion rollers are so mounted that they might be termed floating rollers so that they are self-adjusting to compensate for wear of the outer surfaces of the rollers and the inner surface of the die ring. Also the rollers are so mounted that they can be individually adjusted towards and from the inner surface of the die ring so that the amount of pressure exerted on the material being treated and forced through the openings of the die ring can be varied dependent not only upon the wear of the contacting surfaces of the rollers and the die ring but also the consistency of the material being extruded.

The greatest wear will be between the bottom extruding roller and the lowermost segment of the die ring, but the floating rollers will compensate for such wear of the die at the bottom segment of the die ring to prevent build up of material being treated between the rollers and the die ring.

A rotating die will by centrifugal force prematurely extrude the material being treated from the die so that uniform length of the end or final product is not obtained.

Six-eight clippers or knives are mounted at front of machine for clipping or cutting off the extruded material as it leaves the die ring. These clippers rotate around the outer surface of the die ring and clip or cut off the extruded material as they rotate in the desired lengths. The more clippers that are employed the less the required speed of rotation of the clippers. This is important because if the clippers are driven at too high a speed they will cause crumbling or fragmenting of the extruded material. The speed of the clippers can be regulated by controlling the speed of the motor which rotates the cutting means.

The present die ring is reversible so that if the one edge portion of the die wears down more than the other edge portion of the die ring can be reversed so that the leading edge portion of the die ring will become the trailing edge portion thereof.

Also if the bottom segment of the die ring becomes unduly worn so that it becomes egg-shaped the die ring can be circumferentially adjusted by any angular extent desired to bring the lower egg-shaped segment away from the bottom of the die where most wear occurs due to the fact that the lowermost extrusion roller bears with more pressure on the bottom segment of the die due to gravity. The bolt holes in the front face of the die and in the rear face of the die are in horizontal alignment.

The inner surface of the die ring is raised slightly above its supporting structure so that the life of the die ring is increased.

In the present machine the mixing chamber for the material being treated is built into the machine while in the prior art the mixing chamber is a separate unit from the pelletizer. This feature plus the eliminating of supporting bearings for the mixing drive and feeding shaft enables the present pelletizer to be constructed for a fraction of the cost of the prior art machines some of which cost about $50,000.00 while the present pelletizer can be built for a much less cost.

Moreover, the elimination of the supporting bearings enables the present machine to be dismantled much more quickly for the purpose of replacing the extrusion rollers and the die ring when required. This reduces not only the labor costs but also the shut down time of the machine. Since the present machine requires no bearings no oil or lubricant is required for such bearings and no oil seals are required.

The hinged door at front of machine affords quick and easy access to the clippers and other parts of the machine.

Feed or guide plates are provided at the rear of the die ring and rollers to guide the material being treated in between the rollers and die ring and feed or guide plates or surfaces are provided at the forward end of the rollers and die ring to guide the material being treated back towards and between the rollers and die ring.

The die ring has a life of 3–4 times that of the extrusion rollers. One set of rollers will probably last long enough to work on 150–200 tons of material. The present machine can turn out about 50 tons in a 10 hour day. 3–5 tons of material can be handled in 1 hour by six clippers rotating 300–450 revolutions per minute (RPM).

BRIEF DESCRIPTION OF THE DRAWINGS

FIG. 5 is a fragmentary side elevational view of the mixing blades and extrusion rollers shaft and how the shaft is supported, FIG. 6 is a side elevational view of the conveyor belt for carrying away the pelletized material and the funnel member for directing the pellets from the die to the conveyor belt, FIG. 7 is a fragmentary perspective view of the guide vanes for directing the material being treated on back toward the extrusion rollers and showing the cutter blades, FIG. 8 is an enlarged fragmentary side elevational view of the front end portion of FIG. 1, and FIG. 9 is an enlarged fragmentary view of one of the extrusion rollers and the adjustment means therefor.

DESCRIPTION OF THE PREFERRED EMBODIMENT

Figure 1:
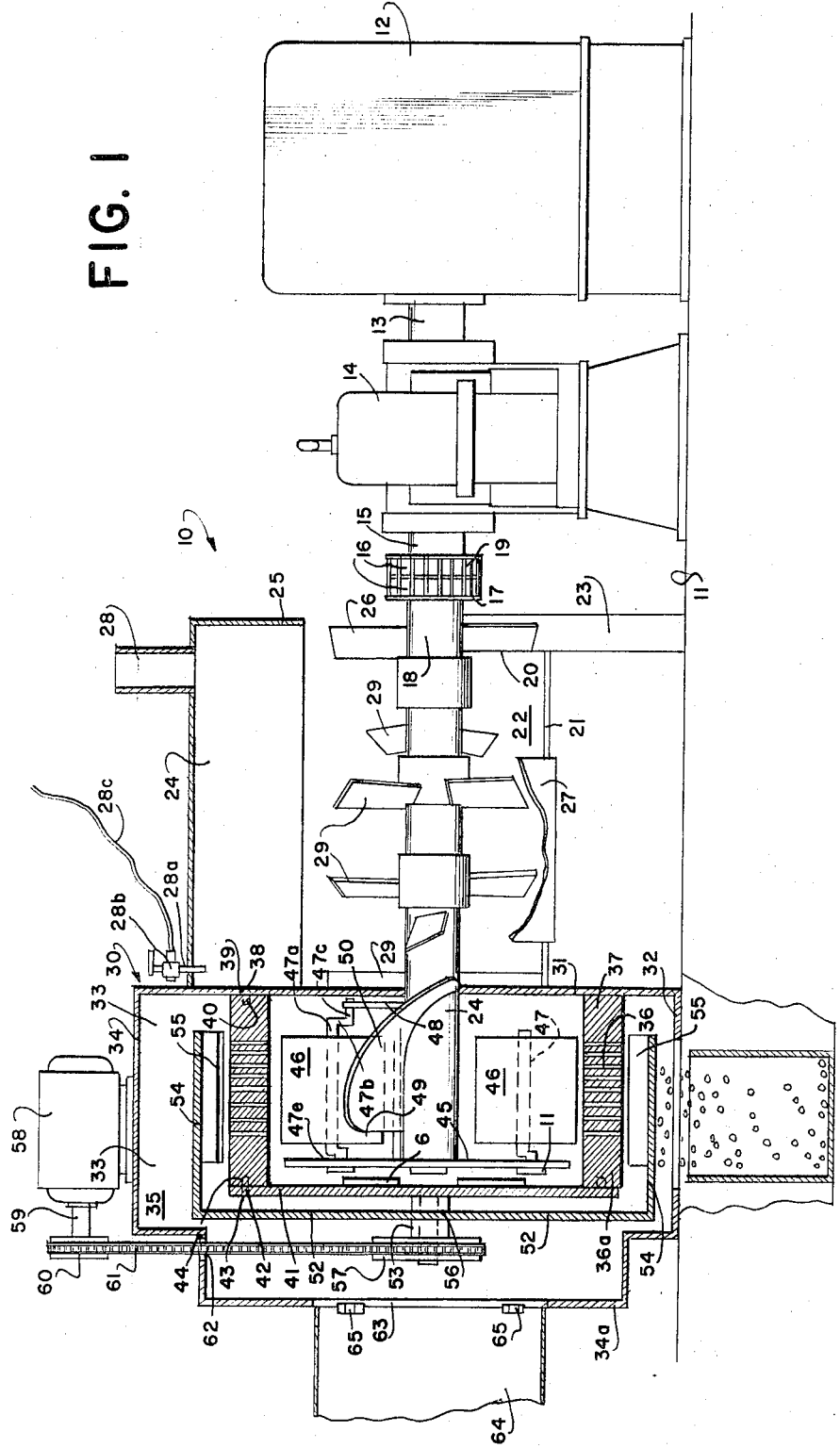
FIG. 1 is a side elevational view of the pelletizer constructed in accordance with the present invention with parts broken away and parts in section.
Figure 3:
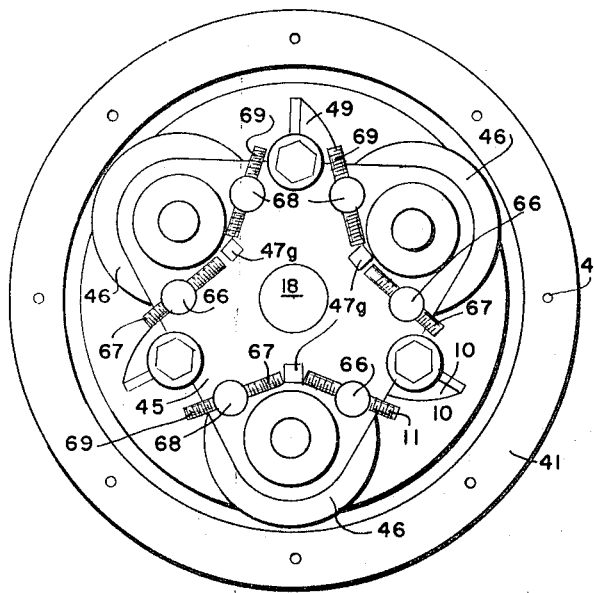
FIG. 3 is a front end view of the extrusion rollers and die.
Figure 4:
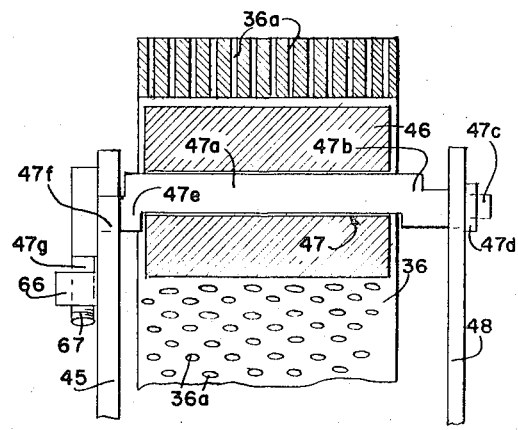
FIG. 4 is a fragmentary sectional view of one of the extrusion rollers showing the adjustable mounting therefor.
Figure 2:
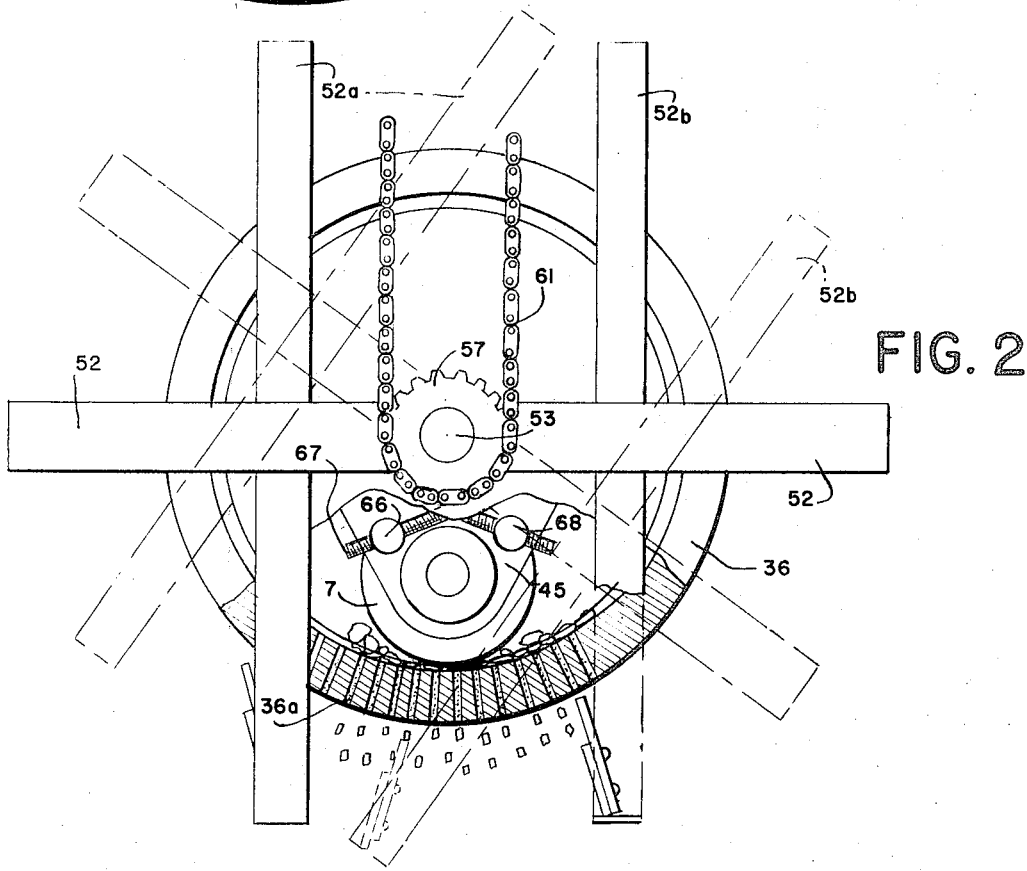
FIG. 2 is a front end view of the cutters.

Referring now more particularly to the accompanying drawings and initially to FIGS. 1 and 8 thereof, the reference numeral 10 generally designates the pelletizing apparatus of the present invention. The apparatus comprises a base 11 supporting at its rear end an electric or other motor 12. The motor 12 has a driven shaft 13 extending forwardly therefrom which is coupled to a reduction gear housed in a gear box or housing 14 from which extends forwardly a driven shaft 15. A sprocket wheel 16 is mounted for rotation with the shaft 15 on the forward end thereof and a sprocket wheel 17 is mounted on the rear end of a mixing shaft 18 for rotating said mixing shaft 18. A sprocket chain 19 spans the sprocket wheels 16 and 17 and together therewith forms a flexible or resilient coupling. This coupling could be in the form of a rubber or leather belt bridging two drums or pulleys.

The mixing shaft extends forwardly through a suitable opening in the rear wall 20 of the lower portion 21 of a mixing chamber 22 which is supported from the base 11 by struts 23. The upper part of the mixing chamber 22 is closed by a removable top or upper portion 24 having a rear wall 25. A dust seal 26 embraces the rear end part of the shaft 18 and is secured to the rear face of the rear walls of the upper and lower portions of the chamber 22 to prevent the entrance of dirt or other foreign matter to the chamber 22. The lower portion 21 of the chamber 22 is provided with an access or clean out door 27 and the upper portion 24 of the chamber 22 has an inlet 28 for the introduction of the material to be pelletized and for water or steam or a separate inlet 28$^a$ could be provided for the introduction of water or steam into the mixing chamber 22. The inlet 28$^a$ includes a valve 28$^b$ to which is connected a conduit 28$^c$ which leads to a source of liquid or steam not shown.

The forward end portion of the mixing shaft 18 is provided with a plurality of rows or flights of mixing blades 29, the adjacent rows of blades being angularly offset with respect to one another around the shaft 18. These blades 29 not only mix the water and/or steam with the material being treated but also advance the mixture forwardly through the mixing chamber 22 in the manner of an auger or screw conveyor action.

At its forward end portion the base 11 supports a housing generally indicated at 30 which comprises a rear wall 31, a bottom wall 32, side walls 33, a top wall 34 and a front wall 34$^a$. This housing defines a pelletizing chamber 35. The forward end of the mixing chamber 22 communicates with the pelletizing chamber 35 through a suitable opening in the rear wall 31 of the housing 30. A stationary die member 36 in the form of an annular ring is mounted in the pelletizing chamber 35 and is carried by a die supporting member 37 which is removably secured to the rear wall 31 of the housing 30 by a plurality of fastening elements 38 which may be in the form of threaded bolts and nuts, the bolts extending through openings 39 formed in the rear wall 31 and being received by screw threaded sockets 40 formed in the rear surface of the supporting member 37 which is cylindrical in shape and has a width greater than that of the die ring 36 so that the member 37 extends forwardly and rearwardly of the die ring 36. The internal surface of the die ring is raised above the internal surface of the member 37 so that the internal surface of the die ring is capable of withstanding considerable wear before the internal surface of the die ring becomes flush with or is depressed below the internal surface of the member 37. The die ring is formed with a plurality of extruding openings 36$^a$.

A cover plate 41 is removably secured to the forward face of the supporting member 37 by fastening elements 42 which may take the form of threaded bolts and nuts, the bolts extending through suitable openings 43 formed in the plate 41 to be received by screw threaded sockets 44 formed in the forward face of the supporting member 37. The sockets 40 and 44 are in horizontal alignment.

A substantially triangular plate 45 is mounted on the forward end of the shaft 18 for rotation therewith. A plurality of extrusion or compressing rollers 46 are mounted on the plate 45, three of said rollers being illustrated. The rollers 46 are disposed at substantially 120 degrees apart and each roller is mounted on its own spindle or shaft indicated generally at 47 for free rotation thereon. Each spindle 47 has a cranked portion 47$^a$ on which the roller 46 rotates. The spindle 47 has a portion 47$^b$ which extends at substantially right angles to the cranked portion 47$^a$ at the rear end thereof and terminates in a screw threaded portion 47$^c$ which extends rearwardly from the portion 47$^b$ and at right angles thereto. The threaded portion 47$^c$ extends through a suitable smooth bore in an arm 48 which is carried by the shaft 18 rearwardly of the rollers 46. A nut 47$^d$ is mounted on the screw threaded portion 47$^c$ rearwardly of the arm 48 for preventing forward axial movement of the spindle 47. At its forward end the spindle 47 has a portion 47$^e$ which extends at substantially right angles to the cranked portion 47$^a$ which terminates in a portion 47$^f$ which extends forwardly of the roller 46 through a suitable opening in the plate 45. The portion 47$^f$ has mounted thereon a lug or ear 47$^g$ which abuts the plate 45 to prevent rearward axial movement of the spindle 47.

Adjacent each lug 47$^g$ the plate 45 has mounted thereon a supporting member 66 provided with a screw threaded bore for receiving therethrough and adjustably supporting an adjusting screw 67. A second supporting member 68 similar to the member 66 is also mounted on the plate 45 adjacent each lug 47" for adjustably supporting an adjusting screw 69. The purpose of the adjusting screws 67 and 69 is to rotate the spindle 47 in either direction to rotate the cranked portion 47" to move the rollers 46 either towards or away from the inner surface of the die 36 to compensate for wear of the rollers or the die and to accommodate various thicknesses of the material being pelletized. To adjust the rollers 46, one screw is backed off away from the lug 47" and the other screw is moved into engagement with the lug 47" to rotate the spindle the desired distance to properly adjust the rollers. The first screw is then moved back into engagement with the lug 47".

As best shown in FIG. 6, the bottom wall 32 of the forward housing 30 has an opening therein in which is supported a hopper 70 through which the pellets fall onto an endless conveyor 71 which is driven by a suitable motor through the conveyor shaft 72. The pellets are discharged at an appropriate station.

A partition plate 49 is secured to the forward end portion of shaft 18 between each adjacent pair of rollers 46 and a curved guide feed vane 50 is secured to each partition plate 49 and to the shaft 18 forwardly of the foremost mixing blade 29 for rotation with the shaft 18. The vanes 50 are so curved that they will feed the material to be pelletized from the foremost mixing blades to and between the rollers 46 so that the rollers 46 will compress the material and force it out through the openings 36" of the die 36 in extruded form.

For cutting the extruded material into pellets of the desired length, there are provided a plurality of cutters or snippers generally indicated at 51 (see FIG. 7 of the drawings). The cutters comprise two elongated members 52 secured at their inner ends to a hub 53 and extending radially outwardly therefrom beyond the outer surface of the die ring 36 and each having an arm 54 extending rearwardly over the outer surface of the die ring 36 in spaced relation thereto. A cutting or snipping blade 55 is carried by the lower or inner face of each arm 54 in spaced relation to the outer surface of the die ring so as to cut off the extruded material into pellets of the desired length. The hub 53 is mounted on a stub member 56 carried by the cover plate 41 for free rotation on the member 56 (see FIG. 1). The hub 53 has fixed thereto a sprocket wheel 57 and an electric motor 58 is mounted on the top wall 34 of the housing 30 (see FIGS. 1 and 8). The driven shaft 59 of the motor 58 carries at its forwardly extending end a sprocket wheel 60 and a sprocket chain 61 is entrained about the sprocket wheels 57 and 60. The cutters 51 also include an elongated member 52" which is secured to one of the members 52 and a second elongated member 52" and each member 52" and 52" has an arm 54" at each outer end thereof and extending rearwardly over the outer surface of the die ring 36 in spaced relation thereto. A cutting blade 55" is carried by the inner face of each arm 54" similar to blades 55.

The top wall 34 of the forward housing 30 has an opening 62 formed therein (see FIG. 1) to permit passage of the sprocket chain 61 through the wall 34 and to the sprocket chain 57. The front wall 34" of the housing 30 is provided with an access opening 63 which is masked by an access door 64 hingedly mounted on the front wall 34" as at 65.

As can be seen from FIG. 7 guide vanes 73 are carried on the rear face of the cover plate 41 and are curved in the opposite direction to the feed vanes 50 on the shaft 18. The vanes 73 feed back between the rollers 46 and the die 36 any material being treated which is moved forwardly of the rollers without being pelletized.

OPERATION OF THE APPARATUS

Assuming that the motor 12 is operating, and the mixing shaft 18 with its blades 29 are rotating the material to be pelletized will be introduced into the mixing chamber 22 through the inlet 28 and the liquid or steam is introduced into the chamber 22 so that the material to be pelletized will be thoroughly mixed with the liquid or steam to form a mass of the proper consistency to admit of being pelletized. The blades 29 accomplish this objective and also feed the mass of material forwardly through the mixing chamber and into and between the extruding rollers 46 and the outer surface of the die 36, the vanes 50 assisting in directing the mass of material in the proper direction. The rollers 46 will force the mass of material through the openings 36" of the die in extruded form.

At this time the motor 58 will be energized so that the cutters 51 will cut the extruded material into the desired lengths.

As the extruding rollers rotate the lowermost roller will be supported by the lowermost segment of the die ring 36 so that in time due to friction the lowermost segment of the die 36 may become worn or egg-shaped. In this event the fastening elements 38 and 42 may be removed and the die rotated angularly to move the lowermost worn segment upwardly and the fastening elements then inserted to hold the die in its newly angularly adjusted position. In the event the forward portion of the inner surface of the die becomes unduly worn, the fastening elements 38 and 42 can be removed and the die reversed and the fastening elements can then be replaced to hold the die in its reversed position.

The fact that the rollers 46 support the shaft 18 by engaging the inner face of the die 36 eliminates the necessity of providing bearings at the forward end of the shaft 18 and the provision of the flexible coupling at the rear end of the shaft 18 provides sufficient support for the rear end portion of the shaft so that bearings at that location are not needed while only permitting a negligible amount of back lash or wobblings.

The pellets produced by this apparatus are adapted for live stock feed for animals, for example, poultry, rabbits, and cattle and the speed of the cutters can be regulated to cut the extruded pellets in the desired lengths for the various live stock by varying the relative size of the sprockets 57 and 60.

As shown in FIG. 9 of the drawings when the adjusting screws 67 and 69 are moved the roller 46 will be moved from the full line position to the dotted line position indicated at D in FIG. 9 to bring the worn roller into contact with the inner face of the die 36.

Of course, while the best known forms of the present invention have been described herein and shown in the drawings, it is obvious that changes can be made therein so that the inventive concept is only restricted by the spirit and terms of the appended claims.

We claim:

1. A pelletizing apparatus comprising a mixing chamber for receiving the material to be pelletized and a fluid, a mixing shaft rotatably mounted in the mixing chamber, a stationary extrusion die in communication with the mixing chamber, at least one extrusion roller mounted on the mixing shaft for rotation therewith and operatively associated with the die, and means on the mixing shaft for mixing said material and said fluid and for feeding the mixed material and fluid to said roller between the roller and die so that said roller will extrude the mixed material and fluid through the die, said shaft being substantially wholly supported by said roller engaging the die so that no bearings are required for supporting said shaft.

2. A pelletizing apparatus as claimed in claim 1, wherein said extrusion roller is adjacent the forward end portion of said shaft, means are provided for rotating said shaft and a flexible coupling is provided between the shaft rotating means and the rear end portion of said shaft for supporting the rear end portion of the shaft while permitting only a negligible back lash or wobbling thereof.

3. A pelletizing apparatus as claimed in claim 1, wherein said shaft is provided with flights of mixing blades for mixing said material and fluid and for feeding the mixed material and fluid forwardly toward the die and roller, and at least one guide vane is carried by said shaft for guiding said mixed material and fluid to said roller.

4. A pelletizing apparatus as claimed in claim 1, wherein means are provided for cutting the extruded material into desired lengths.

5. A pelletizing apparatus as claimed in claim 1, wherein a plurality of extrusion rollers are carried by said mixing shaft for rotation within the die, and adjusting means are provided for adjusting said rollers towards and away from the inner surface of the die to compensate for wear of said rollers and the inner surface of the die and for accommodating mixed material to be pelletized and fluid of varying consistencies.

6. A pelletizing apparatus as claimed in claim 1, wherein means are provided for effecting angular adjustment of said die and for reversing said die to compensate for wear of segmented portions of the die.

7. A pelletizing apparatus as claimed in claim 1, wherein said mixing chamber is provided with inlet means for the material to be pelletized and said fluid.

8. A pelletizing apparatus as claimed in claim 1, wherein said die is provided with extrusion openings for the extruded material, a conveyor is provided for the extruded material and means are operatively associated with the extrusion openings and the conveyor for conducting the extruded material from the die to said conveyor.

9. A pelletizing apparatus as claimed in claim 1, wherein said die carried a plate forwardly of the die, a stub member is carried by said plate and projects forwardly thereof, means are provided for cutting the extruded material into desired lengths, said cutting means comprising a hub adapted to be mounted on said stub member, a plurality of elongated members secured at their inner ends to said hub and extending radially outwardly therefrom beyond the outer surface of the die, each elongated member being provided with an arm extending rearwardly over the outer surface of the die, and a cutting blade is carried by each arm in spaced relation to the outer surface of said die, a sprocket is provided on said hub, a motor having a driven shaft with a sprocket therein is provided and a sprocket chain is entrained over said sprockets for driving said hub and said cutting means.

10. A pelletizing apparatus as claimed in claim 1, wherein a plurality of extrusion rollers are carried by said mixing shaft, each of said rollers is mounted on a crank shaft, a triangular shaped plate is carried by partitions between said rollers and means are carried by said plate for adjusting the rollers towards and away from said die, said adjusting means including a supporting member having a screw threaded bore on said triangular plate, a second supporting member having a screw threaded bore, a lug is mounted on each crank shaft between said supporting members and an adjusting screw is carried by each supporting member and adjustably received by the screw threaded bore therein adapted to engage said lug for rotating said crank shaft to adjust the rollers towards and away from the die when one adjusting screw is moved away from said lug and the other adjusting screw is moved against said lug the crank shaft will be rotated in one direction the desired amount to move the roller and then the other adjusting screw is moved into engagement with said lug to hold the crank shaft and the roller in its newly adjusted position.

11. A pelletizing apparatus as claimed in claim 1, wherein a plate is carried by said die forwardly of the roller and a guide vane is carried by the rear face of said plate to guide back to the roller any material which might move forwardly of the roller.

12. A pelletizing apparatus as claimed in claim 1, wherein said die and roller are positioned in a pelletizing chamber forwardly of said mixing chamber and which pelletizing chamber is in communication with said mixing chamber, and access doors are provided for both chambers.

13. A pelletizing apparatus as claimed in claim 1, wherein said mixing chamber comprises two portions capable of being separated.

* * * * *